(12) United States Patent
Liu et al.

(10) Patent No.: US 7,624,406 B2
(45) Date of Patent: Nov. 24, 2009

(54) DISK-FEEDING APPARATUS FOR INFORMATION STORAGE DISKS

(75) Inventors: Ming-Hsun Liu, 3f, No. 8, Lane 143, Xinming Rd., Neihu District, Taipei (TW) 11471; Chung-Hsuan Tsai, Taipei (TW)

(73) Assignee: Ming-Hsun Liu, Taipei (TW)

( * ) Notice: Subject to any disclaimer, the term of this patent is extended or adjusted under 35 U.S.C. 154(b) by 474 days.

(21) Appl. No.: 11/697,298

(22) Filed: Apr. 6, 2007

(65) Prior Publication Data
US 2008/0123478 A1    May 29, 2008

(30) Foreign Application Priority Data
Nov. 24, 2006    (CN) .................. 2006 2 0160302

(51) Int. Cl.
*G11B 33/02* (2006.01)
(52) U.S. Cl. .................................... 720/600
(58) Field of Classification Search .............. 369/30.85; 720/600, 617, 619, 623, 641, 621, 624, 622, 720/647
See application file for complete search history.

(56) References Cited

U.S. PATENT DOCUMENTS

| | | | | |
|---|---|---|---|---|
| 5,691,969 A | * | 11/1997 | Fujisawa | 720/610 |
| 6,661,766 B2 | * | 12/2003 | Takai | 720/614 |
| 7,065,773 B2 | * | 6/2006 | Azai | 720/622 |
| 2002/0067684 A1 | * | 6/2002 | Nakatani et al. | 369/244 |

* cited by examiner

*Primary Examiner*—Allen T Cao
(74) *Attorney, Agent, or Firm*—Pai Patent & Trademark Law Firm; Chao-Chang David Pai

(57) ABSTRACT

A disk-feeding apparatus for information storage disks includes a body and a disk-feeding mechanism. The body has a disk-feeding hole. The disk-feeding mechanism is mounted in the body and includes a driving assembly, a transmission member and multiple disk-feeding wheels. The transmission member is connected to and driven by the driving assembly. The disk-feeding wheels are rotatably mounted in the body and extend partially through an interior surface of the disk-feeding hole to hold disks over the disk-feeding hole, and has a cut edge and a feeding thread. A single disk is moved through the cut edges and the feeding threads to pass through the disk-feeding hole when the disk-feeding wheels are rotated, and the disk is eventually pulled down by gravity.

8 Claims, 5 Drawing Sheets

DISK-FEEDING APPARATUS FOR INFORMATION STORAGE DISKS

BACKGROUND

1. Field of the Invention

The present invention relates to a feeding apparatus for information storage disks. More particularly, the present invention relates to a feeding apparatus using rotational components to feed information storage disks such as compact disks.

2. Description of Related Art

Information storage disks, such as compact disks (CDs) including Compact Disc-Recordable (CD-R), Compact Disc ReWritable (CD-RW), DVD recordable (DVD-R) etc. store digital information in a variety of formats. Generally, for mass replication or the manufacturing of information storage disks such as compact disks, stamps are typically used to transfer data from the master to unrecorded or blank compact disks. However, using the stamp method is only suitable to replicate an amount of a thousand or more disks. Otherwise, the average cost to replicate or manufacture each single compact disk will be expensive and not economic.

For home users or small business users, burners are another solution to replicate disks when only several or tens of disk copies are needed. In addition, automatic burners are convenient to the home users or small business users and save much time when duplicating the compact disks.

A typical automatic compact disk duplication system comprises a robotic arm to deliver blank disks among several working positions. The robotic arm catches one blank disk and conveys the blank disk to a tray of a burner to write data in. After the burner writes the blank compact disk, the robotic arm removes the recorded disk from the tray and conveys the recorded disk to a disk container. Then, the robotic arm catches another blank disk and places the blank disk to the burner tray to write. The operation of the robotic arm is repeated until an amount of the disk copies is achieved.

However, the mechanical structure of the robotic arm is sophisticated, which causes high manufacturing costs. Besides, the entire robotic arm is bulky and occupies a large storage space that is inconvenient to be packaged and/or transported. The automatic compact disk duplication system is expensive.

Therefore, there is a need to provide an improved disk-feeding apparatus to mitigate or obviate the aforementioned problems.

SUMMARY

An object of the present invention is to provide a disk-feeding apparatus that feeds a single disk once by controlling the rotated disk-feeding wheels, and pulled down by gravity allowing gravity to pull the disk into place.

A disk-feeding apparatus for information storage disks in accordance with the present invention comprises a body and a disk-feeding mechanism. The body has a disk-feeding hole. The disk-feeding mechanism is mounted in the body and comprises a driving assembly, a transmission member and multiple disk-feeding wheels.

The transmission member is an annular gear and is connected to and driven by the driving assembly. The disk-feeding wheels are rotatably mounted in the body and extend partially through an interior surface of the disk-feeding hole to hold disks over the disk-feeding hole. Each disk-feeding wheel has a cut edge and a feeding thread. A single disk is moved through the cut edges and the feeding threads to pass through the disk-feeding hole when the disk-feeding wheels are rotated, and is eventually pulled down by gravity when the disk leaves the disk-feeding wheels.

The apparatus in accordance with the present invention have several advantages as follows.

The apparatus allows gravity to pull a single disk to automatically feed the disk onto the tray. Mechanical robots are not needed so that the entire volume of the apparatus is compact. Manufacturing costs of the apparatus is lowered.

The transmission member is an annular gear, which facilitates quick assembly, extends lifetime of use and improves the efficiency of power transmission.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
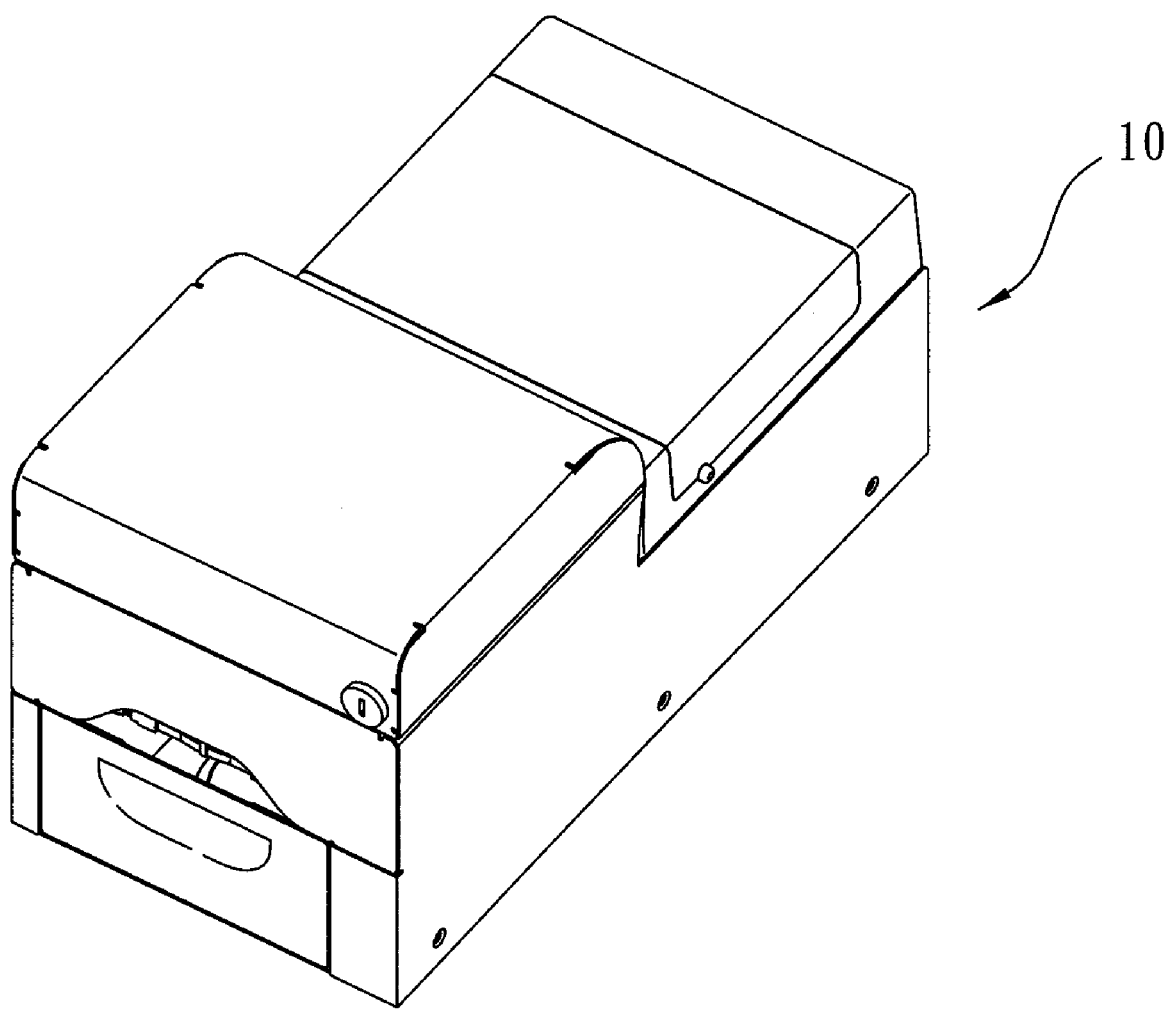
FIG. 1 is a perspective view of an embodiment of a disk duplicating apparatus with an embodiment of a disk-feeding apparatus in accordance with the present invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
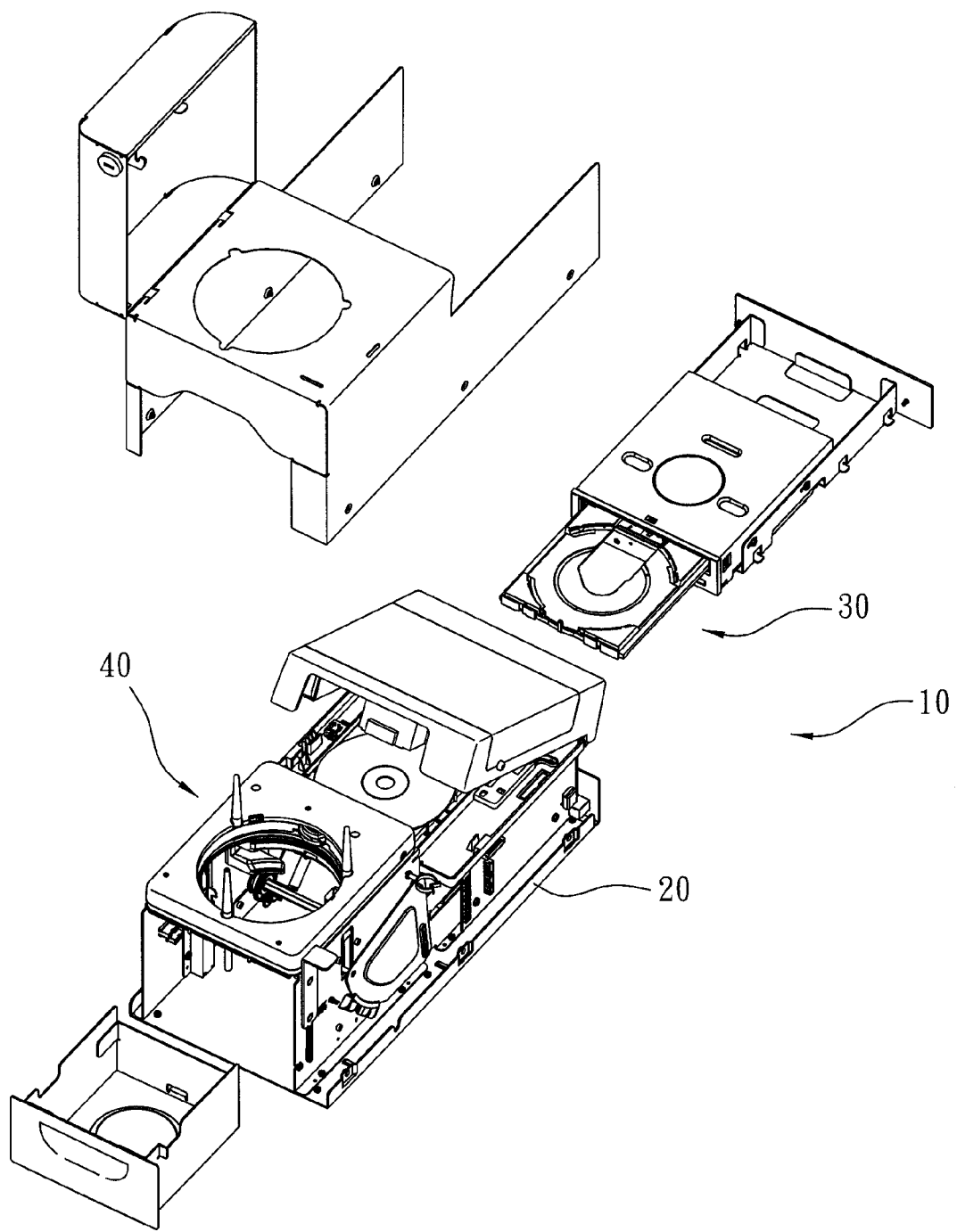
FIG. 2 is an exploded perspective view of the disk duplicating apparatus in FIG. 1.

Refer to FIG. 1 and FIG. 2. An embodiment of a disk-feeding apparatus 40 for information storage disks is adapted to be mounted in a disk duplicating apparatus. In one embodiment, the disk duplicating apparatus is an automatic duplicating and printing apparatus 10 for optical readable compact disks. The automatic duplicating and printing apparatus 10 comprises a frame 20, a duplicating and printing device 30 and the disk-feeding apparatus 40. The duplicating and printing apparatus 10 is adapted for optical readable and/or writable information storage medium, such as Rewritable compact disks, Recordable compact disks, DVDs, etc. and writes data onto the disks to backup or duplicate the data. In addition, the disk-feeding device 40 allows gravity to pull a single disk onto trays of the duplicating and printing device 30 where the duplicating and printing device 30 retracts the trays to copy the disk and print the disk cover.

Figure 3:
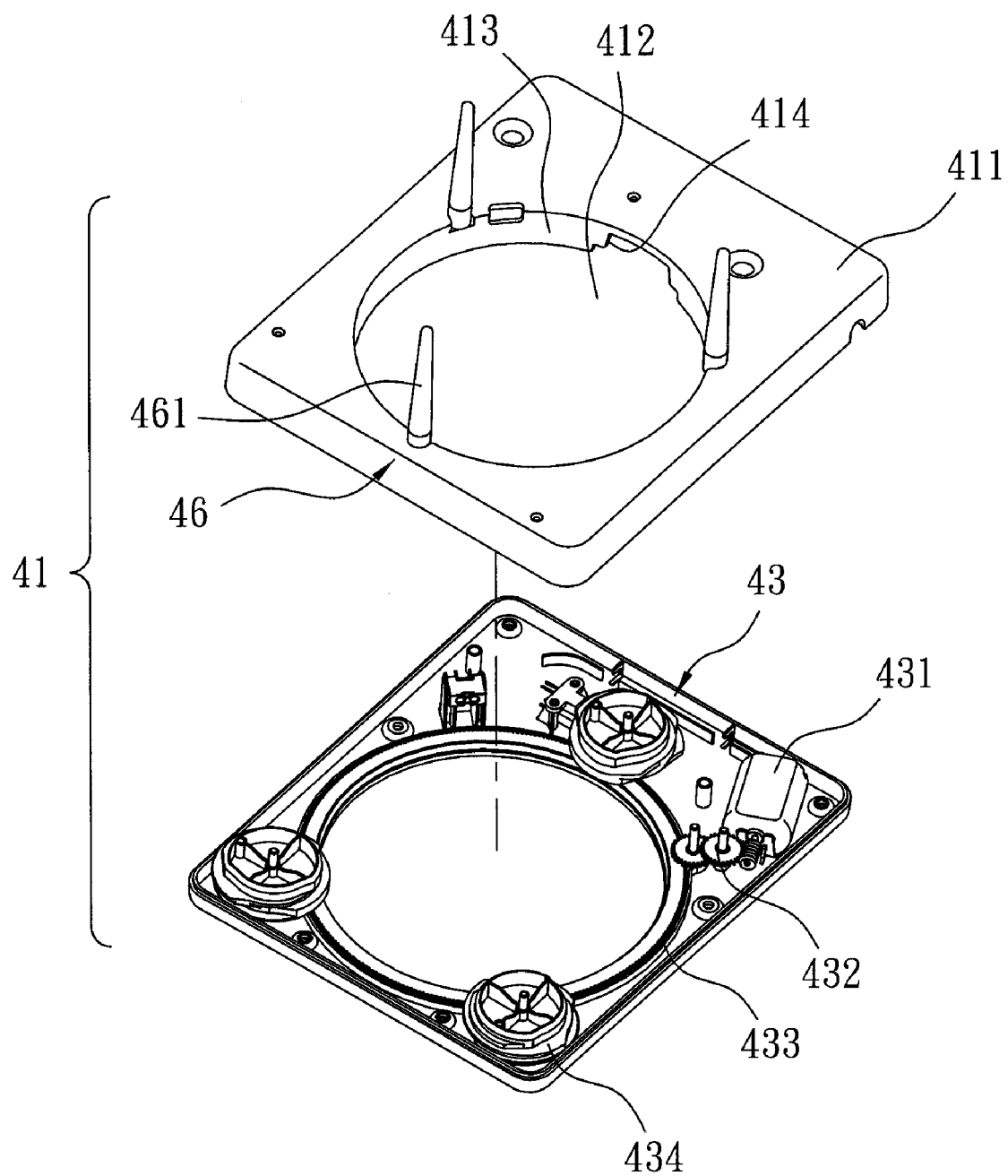
FIG. 3 is an exploded perspective view of the disk-feeding apparatus in FIG. 2.
Figure 4:
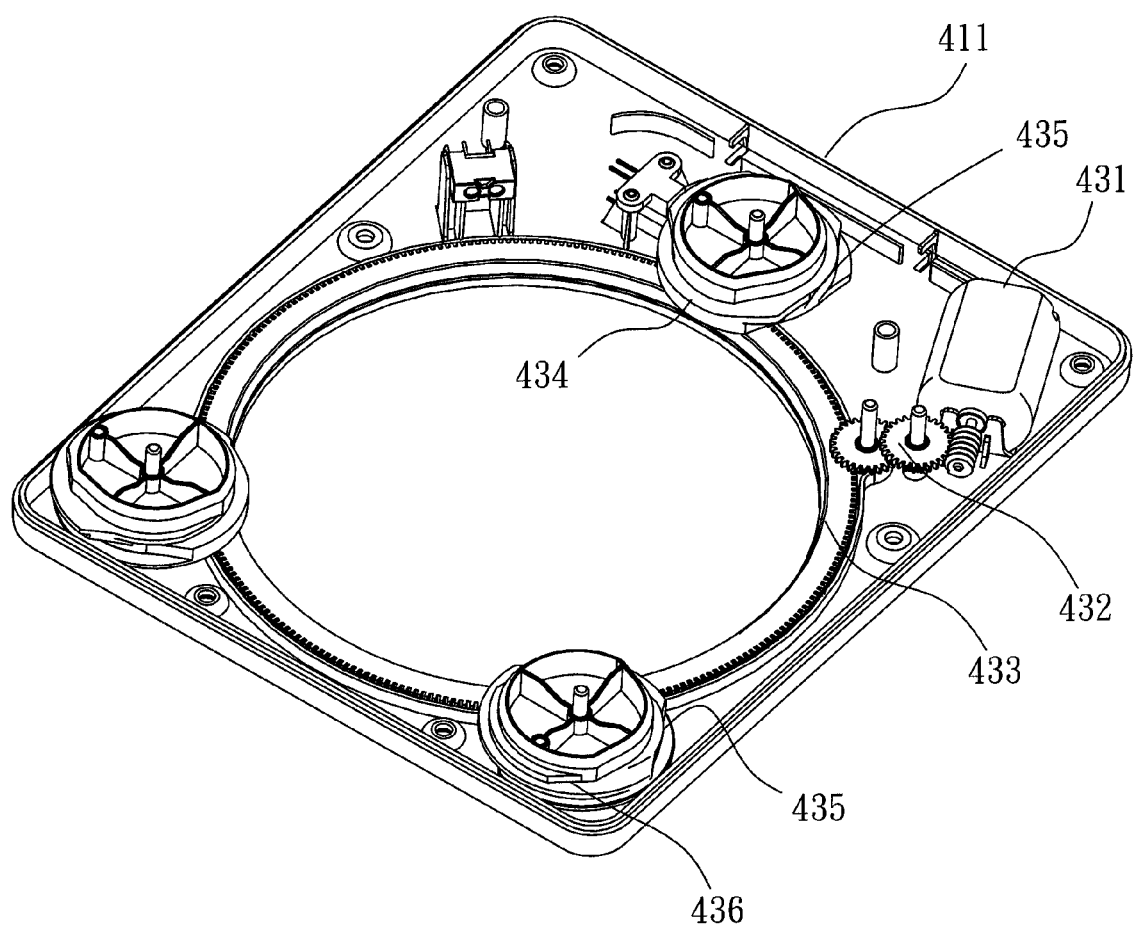
FIG. 4 is a perspective view of a disk-feeding mechanism of the disk-feeding apparatus in FIG. 3.

Refer to FIG. 2, FIG. 3 and FIG. 4. The disk-feeding apparatus 40 comprises a body 41, a disk-feeding mechanism 43 and a disk-guiding device 46.

The body 41 comprises two casings 411 combined mutually each other. The body 41 has a disk-feeding hole 412. In this embodiment, the disk-feeding hole 412 has an interior periphery 413. The interior periphery 413 has multiple openings 414.

The disk-feeding mechanism 43 is mounted in the body 41 and comprises a driving assembly 431, a transmission member 433 and multiple disk-feeding wheels 434. The driving assembly 431 comprises a motor and a reducing device including multiple reducing gears 432. The transmission member 433 is an annular gear or ring gear and engages the reducing gears 432.

Figure 5:
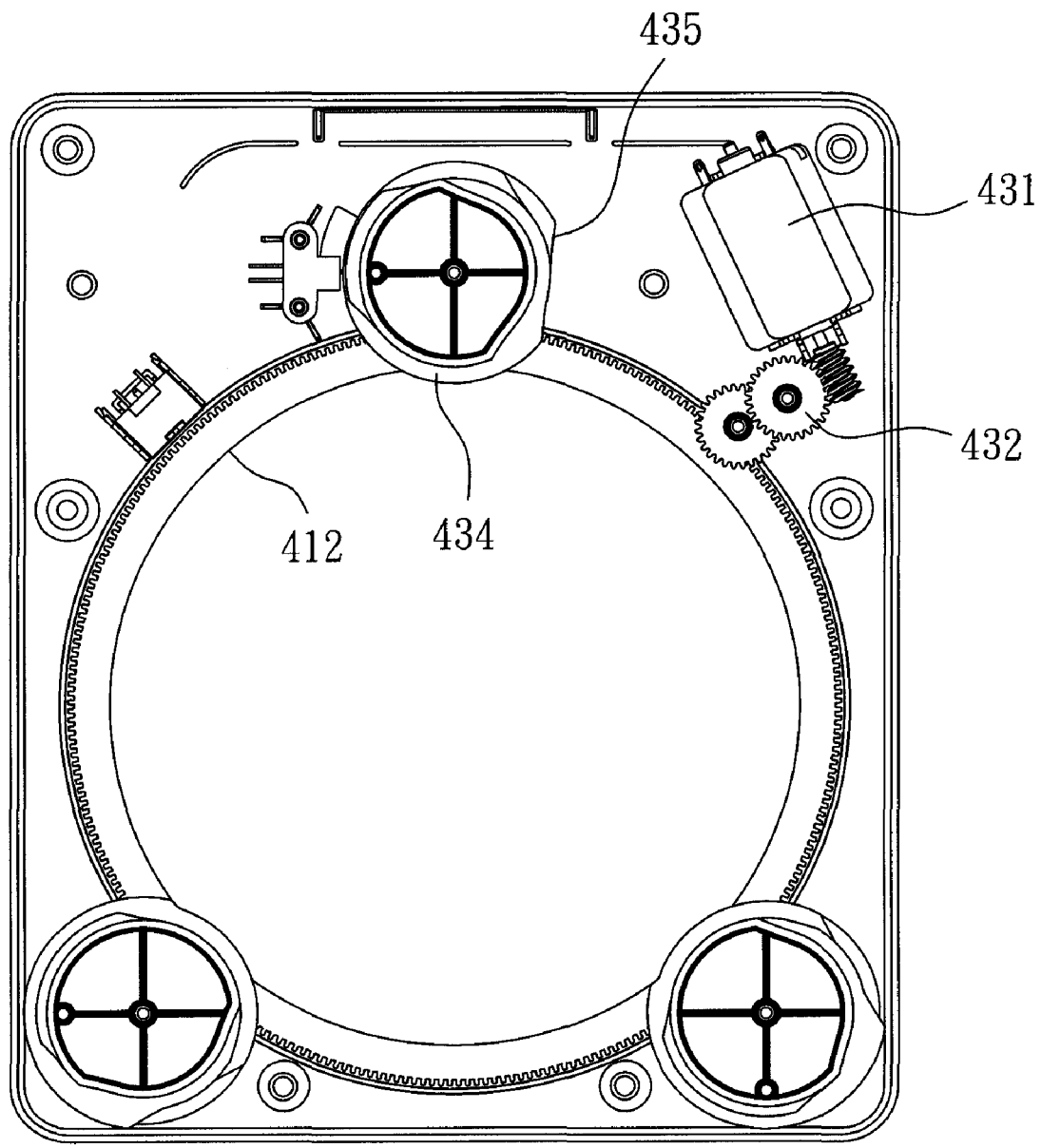
FIG. 5 is a top view of the disk-feeding mechanism in FIG. 4.

Further refer to FIG. 5. The disk-feeding wheels 434 are rotating members and engage the transmission member 433 so that the transmission member 433 can simultaneously rotate the disk-feeding wheels 434. The disk-feeding wheels 434 have respectively a periphery, a cut edge 435 and a feeding thread 436. The cut edge 435 and the feeding thread 436 are formed on the periphery. Further, the disk-feeding wheels 434 are partially extended in the disk-feeding hole 412 through the openings 414 of the interior periphery 413 of the disk-feeding hole 412. The amount of disk-feeding wheels 434 depends on design requirements. In the embodiment, there are three disk-feeding wheels 433. Those three disk-feeding wheels 433 have a triangular arrangement.

Consequently, the portions of the disk-feeding wheels 434 in the disk-feeding hole 412 supports and suspends a stack of blank disks over the disk-feeding hole 412. When using the disk-feeding mechanism 43 to gradually and sequentially feed the disk onto the trays (only one single disk is fed once), the motor rotates the transmission member 433 through the reducing gears 432. The rotating transmission member 433 rotates simultaneously the disk-feeding wheels 434. Rotations of the disk-feeding wheels 434 move the bottom disk of the disk stack through the cut edges 435, and along the feeding threads 436. The disk is eventually pulled down by gravity after the disk passes through the disk-feeding hole 412. When the bottom disk departs from the disk-feeding wheels 434 and falls, the motor is stopped. Thus, the disk-feeding mechanism 43 controls feeding a single disk onto the tray at a time.

The disk-guiding device 46 is mounted on the body 41 around the disk-feeding hole 412 to align the blank disks in position. The disk-guiding device 46 comprises two or more than two guiding posts 461. In the embodiment, the disk-guiding device 46 comprises three guiding posts 461.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A disk-feeding apparatus for information storage disks and the disk-feeding apparatus comprising
    a body having a disk-feeding hole, and the disk-feeding hole having an interior periphery;
    a disk-feeding mechanism mounted in the body and comprising
        a driving assembly;
        a transmission member being an annular gear and connected to the driving assembly; and
        multiple disk-feeding wheels rotatably mounted in the body and rotated by the transmission member, each of the disk-feeding wheels extended partially in the disk-feeding hole through the interior periphery and having a periphery, a cut edge and a feeding thread, and the cut edge and the feeding thread formed in the periphery through which a disk is moved passing through the disk-feeding hole and is eventually pulled down by gravity when the disk-feeding wheels are rotated.

2. The disk-feeding apparatus as claimed in claim 1, further comprising a guiding device mounted on the body around the disk-feeding hole.

3. The disk-feeding apparatus as claimed in claim 1, wherein the disk-feeding mechanism comprises three disk-feeding wheels.

4. The disk-feeding apparatus as claimed in claim 3, wherein the three disk-feeding wheels have a triangular arrangement.

5. The disk-feeding apparatus as claimed in claim 1, wherein the driving assembly comprises a motor, and a reducing device connecting the motor to the transmission member.

6. The disk-feeding apparatus as claimed in claim 1, wherein the body comprises two casings combined mutually with each other.

7. The disk-feeding apparatus as claimed in claim 1, wherein the interior periphery of the disk-feeding hole has multiple openings through which the disk-feeding wheels respectively extend in the disk-feeding hole.

8. The disk-feeding apparatus as claimed in claim 5, wherein the reducing device comprises multiple reducing gears.

* * * * *